Figure 1:
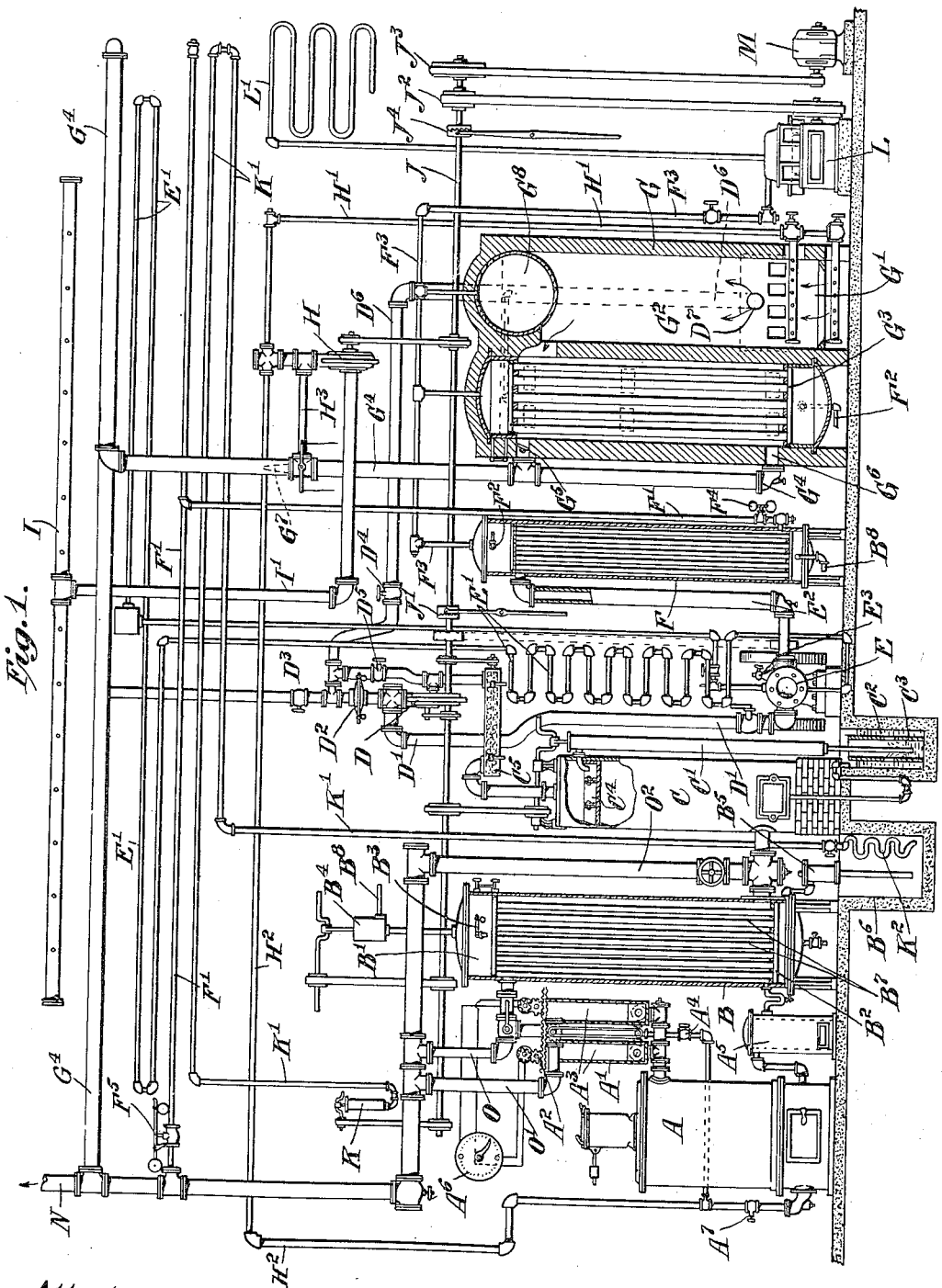

J. M. W. KITCHEN.
MEANS FOR GENERATING POWER.
APPLICATION FILED FEB. 10, 1912.

1,117,193.

Patented Nov. 17, 1914.
2 SHEETS—SHEET 1.

Attest:

Inventor:
J. M. W. Kitchen
by Geo. F. Wheelock
his Atty

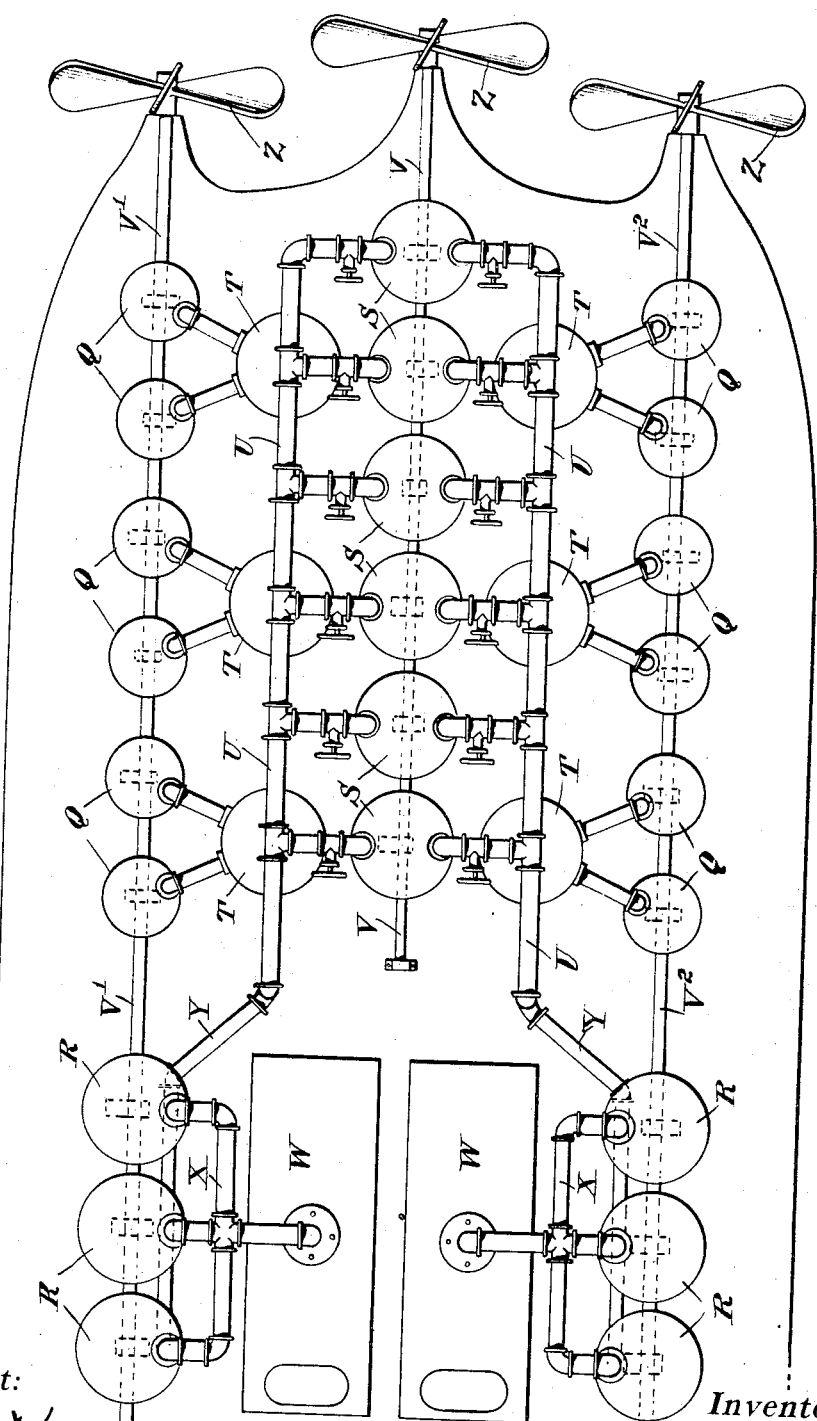

UNITED STATES PATENT OFFICE.

JOSEPH MOSES WARD KITCHEN, OF EAST ORANGE, NEW JERSEY.

MEANS FOR GENERATING POWER.

1,117,193.

Specification of Letters Patent. Patented Nov. 17, 1914.

Application filed February 10, 1912. Serial No. 676,716.

*To all whom it may concern:*

Be it known that I, JOSEPH MOSES WARD KITCHEN, a citizen of the United States, residing at the city of East Orange, county of Essex, State of New Jersey, have invented certain new and useful Improvements in Means for Generating Power, of which the following is a specification.

These improvements relate to methods and means for reducing the cost of generating power through the use of the lowest cost fuel; by producing a cleaner fuel gas; by modifying and controlling the actions which are peculiar to the internal combustion engine; by economizing low degrees of heat wastes; and by using steam power and gas power compositively in connection with the generation of motive power, and especially, of power to be distributed through the electric current; and in economizing waste heat through its application in heating processes.

The present invention is an evolutionary advance on the inventions described and claimed by me in co-pending and other applications: Serial No. 415,983, filed February 14th, 1908; Serial No. 453,275, filed September 16th, 1908; Serial No. 460,267, filed December 4th, 1908; Serial No. 482,127, filed March 8th, 1909; Serial No. 487,694, filed April 3rd, 1909; Serial No. 504,132, filed June 24th, 1909; Serial No. 504,778, filed June 28th, 1909, and Serial No. 551,196, filed March 23rd, 1910.

Subject matter is herein disclosed which is not herein claimed, but which is more or less claimed in each of the named applications.

In the accompanying diagrammatically presented drawings, Figure 1 represents a composite power plant for the generation of fuel gas, the generation of the electric current, and of heat for heating.

The reference characters represent as follows:

A is a gas enerator.
$A^1$ is a tar destructor.
$A^2$ is an electric current shifter.
$A^3$ are heating chambers.
$A^4$ is a duct for air.
$A^5$ is a tar vaporizer.
$A^6$ is a clock-work electrical regulator.
$A^7$ is an air control valve.

B is a gas cooler and condenser of tar and water vapor.
$B^1$ is an upper water chamber.
$B^2$ is a lower water chamber.
$B^3$ is a relief valve.
$B^4$ is a pump.
$B^5$ is another pump.
$B^6$ is a cold well.
$B^7$ are water tubes.
$B^8$ is a pipe for pre-heated water.
C is a scrubber.
$C^1$ is a pump.
$C^2$ is a scrubber well.
$C^3$ is a strainer.
$C^4$ is a water distributing sectional pan.
$C^5$ is a gas washer.
D is a gas exhauster and blower.
$D^1$ is a gas conduit leading from the blower D to the gas engine E.
$D^2$ is a by-pass device.
$D^3$ is a valve.
$D^4$ is a valve.
$D^5$ is a valve.
$D^6$ is a relief gas conduit to the steam generator furnace.
$D^7$ is a gas inlet.
E is a gas engine.
$E^1$ is radiating piping for cooling the jacket water and heating air.
$E^2$ is a gas exhaust pipe lined with non-conducting material which leads to the water heater F.
$E^3$ is a compression relief valve for the gas engine cylinder.
F is a water heater for economizing the exhaust gases of the gas engine E.
$F^1$ is an exhaust gas conduit.
$F^2$ is a water conduit for heated water.
$F^3$ is a steam conduit.
$F^4$ is a compression reduction valve.
$F^5$ is another compression reduction valve.
G is a steam generator.
$G^1$ is the furnace of the steam generator.
$G^2$ is the combustion chamber.
$G^3$ is a tubular steam boiler and water heater.
$G^4$ is a gas exhaust conduit.
$G^5$ is an upper gas outlet which is valve controlled.
$G^6$ is a lower gas outlet.
$G^7$ is an injection device for inducing a draft through the steam generator G and conduit $G^4$.

$G^8$ is a shell boiler.

H is a gas exhauster and blower operated from the motive shaft J.

$H^1$ is a compressed air supply pipe running to the furnace $G^1$.

$H^2$ is a compressed air conduit leading to the producer A.

$H^3$ is the air conduit leading to the injection device $G^7$.

I is a heated air conduit conveying air from a high level through the pipe $I^1$ to the air exhauster and blower H.

J is the motive shaft.

$J^1$ is a clutch.

$J^2$ is a drive pulley.

$J^3$ is a drive pulley.

$J^4$ is another clutch.

K is an air compressing pump.

$K^1$ is a compressed air pipe.

$K^2$ in an air expansion coil.

L is a multiple cylinder steam engine.

$L^1$ is a steam radiating piping and coil.

M is an electric generator.

N is a gas exhaust stack.

O is a by-pass conduit.

$O^1$ is an exhaust gas conduit.

$O^2$ is an exhaust conduit for occasional use.

In Fig. 2 the reference characters indicate as follows:—

Q are oil engine cylinders.

R are high pressure steam cylinders.

S are low pressure steam cylinders.

T are vertical counter-current economizers.

U are low pressure steam distributing mains.

V, $V^1$ and $V^2$ are propeller shafts.

W are boilers.

X are high pressure steam mains.

Y are exhaust steam conduits.

Z are propellers.

A number of features which would be comprised in plants of the kind illustrated, have been omitted from the drawings, as for example: In Fig. 1 a gas pressure regulating and storage tank. A number of connecting pipe conduits have also been omitted or broken away for clearness.

*The gas producer*, (A, Fig. 1.)—This may be of any suitable type, though I prefer to use the type of producer which is described and claimed in my co-pending application Serial No. 482,127, filed March 8th, 1909.

*The tar destructor.*—When gasifying fuel which evolves much tar vapor, I may use the device $A^1$ for transforming the tar vapor into a fixed gas. This device is composed of two heating chambers $A^3$, which are charged with tar free coke, kept in a state of ignition, and through which the newly formed gas is alternately forced or drawn by mechanical means. By means of the electrically actuated shifting mechanism $A^2$, which is intermittently shifted through the action of electric motors controlled by the clock-work contact make-and-break device $A^6$, air and the fuel gas to be heated, are alternately passed through the heating chambers. The coke is blown into a highly heated state by air forced through the inlet pipe $A^4$, and alternately forced through first one and then the other of the heating chambers. The heating of the coke is determined by the time of the blowing periods, which is in turn controlled by the clock-work device $A^6$. This device has a revolving hand which makes contact for pre-determined periods at stated intervals with electrical connecting pins. The electrical current, which operates during periods of contact, operates the ratcheted motor shifting device $A^2$.

While the fuel in one chamber is being blown into incandescence by compressed air, the newly generated producer gas passes through the other chamber, and is highly heated by contact with the ignited coke, or other fuel if used. This process frees the gas from most of the undecomposed tarry vapor. The coke may be replaced by a refractory non-combustible, heated by burned gas.

*The gas cooler and tar condenser.*—The new gas passes into the top of the gas cooler and tar condenser B. In order to provide for the highest desirable compression of the gas in the gas engine, the gas should be cooled before entering the gas engine cylinder. The device now being described provides for the conservation of the heat that is transferred in the cooling of the gas, by a preliminary heating of feed water with high degrees of the heat of the new gas, and for the heating of air for combustion with low degrees of the heat. The device is composed of a lower chamber $B^2$ into which cold feed water is forced and an upper water chamber $B^1$, out from which heated feed water passes, and connecting water tubes through which the cold feed water is forced upwardly, becoming gradually heated. On these water tubes such tarry vapor as passes out from the tar destructor is condensed, along with any water vapor in the gas. Provision is made for the disposition of the condensed matter by vaporizing it in the device $A^5$ and passing the vapor through the zone of combustion in the gas generator A. Or, it may be run into the scrubber well $C^2$. Or the combustible matter condensed may be separated from the water elements and then otherwise used. The feed water primarily heated in this device passes out through the outlet pipe $B^8$, and is forced by the pump $B^4$ into the lower water chamber of the exhaust gas economizer water heater F. The pipe line connecting these two devices is broken in its course for clearness.

There is a relief valve $B^3$, which allows of the introduction of a larger flow of cold water through the device B than would usually be needed for the generation of steam in the plant. This excess water passing out through the relief valve $B^3$ would be passed through a closed pipe, radiating the acquired heat of the water in passing through the pipe and finally be conveyed into the cold well $B^6$. This connecting heat radiating piping is also omitted in the drawing for clearness.

The feed water is pumped by the pump $B^5$ from the cold water well $B^6$, and then more or less of the water heated in the device B is forced by the high pressure pump $B^4$ through the pipe $B^8$, the water heater F, and into the boiler $G^3$, entering the latter through the pipe $F^2$.

The by-pass conduit O provides for the passage of gas from the tar destructor through the exhaust stack N. The conduit $O^1$ provides for the alternate passage of the exhaust gases to the exhaust stack N. The conduit $O^2$ allows for the passage of gases from the bottom part of the device B into the exhaust stack N, this conduit being brought into use when it is necessary to blow very hot gases through the device B in order to melt excessive amounts of tar adhering to the tubes $B^7$.

The air pump K, which is driven from the shaft J, forces compressed air through the piping $K^1$ and through the coil $K^2$ in the well $B^6$. The compressed air loses its heat by radiation, and when expanded in the coil $K^2$, refrigerates the water in the cold well $B^6$.

*The Scrubber.*—The scrubber C has a sectional water pan $C^4$ at an upper level, into which water is pumped by the pump $C^1$ from the scrubber well $C^2$, circuitously. The water in this well is strained from ashy sulfurous and other matters by the strainer $C^3$. The water being used circuitously in the scrubber enables larger volumes of water to be passed through the scrubber at a lower cost than if the water passing through the scrubber were allowed to go to waste. The scrubbing fluid becomes impregnated with ammonia, and then can be sold for fertilizer making purposes.

It will be observed that the heat losses which usually occur in a producer gas power plant and which are lost between or in the producer and the engine, are in this instance economized in the primary heating of water, the lower degrees of heat being transferred by radiators to air, which with other amounts of heated air is economized in the producer A and in the burning of solid fuel in the furnace of the steam generator G.

*The gas washer.*—The gas passing upwardly through the scrubber C is then drawn through the gas washer $C^5$. This washer provides for the horizontal travel of the gas in counter-current to the passage of washing water through the device. The gas is washed through the action of a revolving shaft and connected fins, the shaft being actuated from the drive shaft J.

*The gas exhauster and blower.*—The relatively feeble and intermittent suction force of the gas engine is a poor reliance for the production of a satisfactory draft through the gas producer in the generation of the gas. Hence, besides the pressure blower H, I introduce in a system of this kind a gas exhauster and blower D, actuated by a source of motive power outside of the gas engine. This draws a continuous flow of gas from the gas producer and forces it to the gas engine under a pre-determined pressure, which pressure is determined by the by-pass valve $D^2$. It is necessary to keep up a sufficient and uniform combustion in the gas producer to generate the heat that is necessary to volatilize a gas uniform in quantity and quality from the fuel used, and if the engine does not consume sufficient gas, part of the gas generated is by-passed to the atmosphere through the controlling valve $D^3$ and stack N, which would be especially the case when an inferior gas is being drawn from the producer after a stand-by. Or, it can be by-passed through the conduit $D^6$ controlled by the valve $D^4$ into the furnace $G^1$ of the steam generator G. In case the engine is using all of the gas generated, to secure a uniform pressure of gas forced to the engine, the gas would be intermittently by-passed through the valve $D^5$ and through the blower D. In most cases this by-pass device would be connected with a pressure regulating tank holding more or less gas. This tank and its connections are not shown in the drawing for clearness.

*The gas engine.*—The gas engine E may be of any suitable type, though in the composite generation of steam and gas power, I prefer a single cylinder engine or batteries of single cylindered engines because of lesser cost of construction, simplicity of management and efficiency in the use of fuel. I introduce a compression relief valve $E^3$ in the gas engine cylinder to ease the work of the steam engine L in initiating a working rate of speed in the gas engine. When speed is acquired the relief valve $E^3$ is closed and the force of the gas explosion exerts its full effect in keeping up motion in the engine.

*The jacket water heat radiator.*—The heat of the jacket water of the engine is economized to heat air for combustion by radiating its heat through a closed piped radiator designated as $E^1$. The special design of this radiating device may differ widely, but I usually apply in it the principle of transferring the highest heat of the water to air for combustion at a high level, and progressively lower degrees of heat in the water, to air for combustion at progressively lower levels.

*The exhaust gas economizer.*—The heat in the exhaust gases from the gas engine, or engines if a plurality are used, is economized in the water heater F, which receives its water feed through the pipe $B^8$ from the top of the gas cooler and water heater B. The exhaust gases from the engine are forced through the conduit $E^2$, which is lined with non-conducting material to prevent radiation of the intense heat of the gases which are exhausted at a high level into the water heater F. This water heater is similar in construction to the device B, having upper and lower water chambers and connecting tubing. The feed water is forced upwardly through the device by the action of the pump $B^4$ and the gases forced downwardly therethrough by the exhaust stroke of the gas engine. The state of compression of the gases passing through the device is regulated by the valve $F^4$. The gases are not allowed to expand in this device, as the expansion of the gases would largely reduce the sensible temperature of the gases. By regulating the closure of the valve $F^4$ all the surplusage of kinetic energy developed by the engine E, or nearly all of it, may be transformed into sensible heat, and this in turn be transferred to water, generating water vapor and steam, which after being expanded in the steam engine L of the system, is in turn utilized for heating or other purposes. In this manner almost the entire expansive force of explosion can be applied indirectly in work through the auxiliary use of steam.

Exhaust gases from the device F are passed through the conduit $F^1$ controlled by the pressure valve $F^5$ into the stack N, any unutilized heat being radiated from the pipe $F^1$ and transferred to air for combustion.

*The steam generator.*—I use steam power compositely with gas power in this invention for various reasons. In generating a cheap fuel gas, a certain definite rate of gas production has to be maintained in the generator to produce a gas that is satisfactorily combustible. The rate of production of the gas however may vary to a limited degree. Furthermore, a certain definite rate of speed in the gas engine must be maintained. This also varies, though to only a limited degree. It is very difficult to start a high pressure producer gas engine with the ordinary provisions for initiating motive activity in the engine, such as by using a large volume of highly compressed air. This is a very uncertain and unsatisfactory procedure. If the rate of speed of the gas engine is reduced by an overload or by the defect of a changed quality of the gas generated, delivered to the engine, or through the quantity of gas generated the gas engine stops. By yoking up the immoderate, intractable and undependable gas power with separately generated steam power, those serious defects of gas power can be overcome. Furthermore, a motor separate and apart from the prime mover, should be used for actuating the power motored gas generating and other motored elements, in generating the fuel gas, and to bring the gas at a uniform rate of pressure to the engine. I prefer to use steam power for this purpose.

In a large number of cases where power generation is used, exhaust steam is desirable as a medium to use in heating; and through the composite use of gas and steam power the heat wastes of gas power can nearly all be economized in the generation of steam under pressure, while the heat of exhaust steam after exerting a pressure in power generation, can be utilized in steam heating; or, the exhaust steam can be used to heat air for combustion; or, it may be used for producing motive power through the action of a condensing exhaust, as for instance with a low pressure turbine working condensing. The steam generator G here illustrated comprises a furnace $G^1$ with a controlled air-feed both below and over the fuel mass. It has a combustion chamber $G^2$, which gives a long vertical run for the burning gases. Besides the cylindrical shell boiler $G^5$, which receives the highest heat of the burning gases, there is a boiler and water heater $G^3$ so constructed as to secure a vertical counter-current heating of the water with the gases from the furnace after their passage through the combustion chamber $G^2$.

It will be noted that in a plant of this nature there is a dual use of the exhaust heat of the gas engine, that heat first generating steam power and then being used in heating. The boiler and water heater $G^3$ is similar in construction to the devices B and F, having lower and upper water chambers connected by piping. The gases, after leaving the combustion chamber $G^2$ may be passed directly through the upper gas outlet $G^5$ into the gas conduit $G^4$, from whence the gases are exhausted into the stack N; or, the gases may be, and usually are forced or drawn downwardly through the boiler and water heater $G^3$ out through the lower gas exit $G^6$, and thence be exhausted through the injective effect of the injection device $G^7$ in the conduit $G^4$. The injector device can be operated during the process of feeding fuel, while the forced draft may be used when the doors of the apparatus are closed.

The water level is the same in the water heater F and in the boiler $G^3$.

*The air exhauster and blower.*—Fresh air for respiration and combustion is introduced into the plant at a low level thereof, is progressively heated by radiation from the radiating surfaces, and rises to a high level above the plant to the air conduit I, which would preferably be located at the highest level of an apical concavity, such as the space under a peaked roof, from whence the warm air is drawn in a downward flow through the conduit $I^1$ to the exhauster and blower H, which is actuated by belting from the motive shaft J. This method of saving heat is generally shown and claimed in my co-pending application, Serial No. 415,983, filed February 14th, 1908. The warmed and compressed air is driven through the air conduit $H^1$ to the furnace $G^1$, where it supplies a controlled air feed, both below and above the fuel mass in the furnace. Warm air may be blown through the conduit $H^3$, and through the injection device $G^7$, which induces a draft through the conduit $G^4$, and which exhausts into the stack N. Air is further blown through the air conduit $H^2$ underneath the gas producer A, the amount of air being controlled by the valve $A^7$; and into the tar destructor through the conduit $A^4$.

*The steam engine.*—Steam being generated in the heater F, the boiler $G^3$ and the boiler $G^8$, is conveyed by the pipe $F^3$ to the multi-cylinder steam engine L, which controls the initial motor activity of the plant, the motive power being conveyed by belt from the engine L to the shaft J through the pulley $J^2$. I particularly point to the desirability of using a multi-cylinder steam engine so as to secure a continuous drive to the gas engine's rotary action. Steam being generated under pressure by starting a fire in the furnace $G^1$, the engine L is started, which in turn rotates the drive shaft J. Motion is communicated from this drive shaft to the blower H, to the shaft of the gas washer $G^5$, to the exhauster and blower D, to the pump $C^1$, to the pump $B^4$ and to the pump K. Gas is drawn by the action of the blower D, driven by the shaft J, and after a certain amount of blowing of the producer A, gas when of a proper quality and properly cleansed, is forced to the gas engine E. The relief valve $E^3$ being opened, motion is communicated to the gas engine from the shaft J by the clutch $J^1$, and after the gas engine has attained the proper speed the relief valve $E^3$ is closed and gas is admitted to the engine and is exploded in the usual way. The connecting pulleys between the engine L and the shaft J, and between the engine E and the shaft J, are so differentiated as to size as to secure a favorable rate of rotation in both the internal combustion engine and the steam engine if the two engines are to be run in unison. The two sources of motive power may be run together continuously, or the steam engine may be disconnected from the motive shafts by the clutch $J^4$, or more or less steam power motivity may be added to the gas power motivity by varying the rate of combustion in the furnace of the steam generator. In this way the defects and disadvantages of gas power may be overcome by uniting the two powers and controlling the gas power by the more tractable force of the steam.

*The electric generator.*—It will be understood that the motive power generated in the manner described may be used directly without any generation of the electric current; or, the power generated may be transmitted electrically.

M represents any convenient type of electric generator, from which the electric current is conducted to places of use. The internal gas engine might, and usually would be directly connected with a suitably wound electric generator, instead of exerting its power indirectly through the shaft J.

*Utilizing exhaust steam.*—The exhaust steam from the auxiliary motor L would be used when desired for heating, a heating system being represented by the piping and coil $L^1$; or, the heat of the steam may be radiated and transferred to air for combustion, which with other amounts of heated air would be used in burning fuel in the furnace of the steam generator. In cold weather more of the steam would be used in heating. While in summer most of the waste heat would be used regeneratively in generating power.

*The air heating system.*—It will be noted that the various heat radiating pipes would be arranged in such manner underneath the hot air conduit I that the air would be gradually heated by radiated heat of progressively increasing temperatures. The gases of highest temperature emerging from the boiler $G^3$ would be radiated in the pipe $G^4$, giving the air for combustion its highest heating.

From what has now been said, it will be noted that a very considerable part of the heat energy originally stored in the fuel used in the producer A, and not used in the direct production of kinetic energy in the gas engine, is largely economized in heating water and forming steam, which is first used expansively in the engine L, and finally utilized either in heating, or used regeneratively in the creation of fresh supplies of steam under pressure. It will be understood that if the steam is not otherwise used from the engine L, it can be further used in a low pressure turbine run condensing, and that the heat of the water of condensation and of condensing water could also be transferred to air for combustion or respiration, and that all the water would be returned by conduits, not shown in the drawing, to the cold well $B^6$, being used in cycle.

It will be noted that feed water is first cooled by the action of liberated compressed air. After first using the feed water to condense tar, it is gradually heated and receives its highest primary heat in the top of the device B. It is then given a secondary heating in the water heater F, and is given its highest and final heating in the boilers G² and G³.

The breadth of the inventive ideas comprised in this invention must be considered as including the proposition of controlling the immoderate and undependable activity of the explosive burning of gasified, vaporized, or finely comminuted dust fuel in an internal combustion engine through the agency of a separately engendered active force more or less accumulated and stored, and applying this accessory force in a more continuous and gradually exerted outgo of the accessory force in connection with the immoderate force of explosion, as modified to the work actually to be done. This proposition can be carried out by having the gas engine generate an electric current and then applying the current through an electric motor to the driving of a working shaft, such for example as the shaft of a propeller, either directly or indirectly from a storage battery. This proposition can be improved by having the energy of the gas engine under the control of the stored electric energy. This matter of control refers particularly to starting the engine, to making the rate of speed of the engine vary as to rapidity over large rates of speed, of keeping up the revolutions of the engine during lower rates of speed over the full cycle of the engine, and overcoming by means of the accessory power, the force of compression and the force of expulsion of the burned gases. By proper modification of structure more or less of the force exerted in an auxiliary manner can be applied to supplement the activity of the gas engine, and when the gas engine is doing full work, such auxiliary energy can be cut off more or less as economy requires.

The same general idea of using an intermediate medium for transmitting the power from the immoderate gas engine to the motored elements, can be applied by having the gas engine actuate a rotary or other pump, propelling a power transmitting fluid, and have the fluid drive the motored shaft. This can be performed directly, or the fluid can be forced into a compression tank and more or less force accumulated, which in turn would be hydraulically exerted in driving the motor shaft of the working element. Air alone could also be used as an intermediary power transmitting agent between the gas engine and the motored element. I prefer to use steam in this connection, because water has the property of absorbing so great a quantity of heat energy, and because with the use of steam it is possible to utilize so much of the waste heat of the gas engine. This heat waste can be accumulated through the mechanical compression of water vapor by the energy of the gas engine, accumulating the energy by storing it in the shape of superheated water, from which the energy can be drawn by flashing the superheated water into steam to drive the motored shaft. Or, the energy of the gas engine may be transferred to stored hot water by forcing the exhaust gases of the engine through a water heater under a regulated pressure, and thus giving the water in the heater a super-heat of any desired degree, from which super-heated water steam can be used in driving the motor shaft. The motored shaft can be actuated by one or more gas cylinders and one or more steam cylinders or turbine motor; the general idea being to control the general activity of the gas engine through the activity of an accessory force of a different character, applied in unison with the force of gas explosion. It will be noted that this idea is different from the idea of using steam generated by the heat wastes of the gas engine but which is not exerted by a control separate from the activity of the gas engine. The jacket water may be used indirectly to heat the feed water; or be used directly as feed water.

Fig. 2 represents diagrammatically a plan view of the power plant of a marine vessel in which some of the principles of my invention are applied, and in which the composite development of rotary energy is conveyed to propeller shafts by a plurality of oil engine cylinders and by a plurality of steam cylinders. The piston rods of the various cylinders are connected to the shafts by concentrics keyed to the shafts. Initial high steam power is generated in the boilers W, W, and high pressure steam is delivered to the high pressure steam cylinders R, which are so connected with the shafts V¹ and V² that a continuous high pressure drive is communicated to the shafts. Suitable machinery, including reversing gears, enables the shafts to be started and reversed at will. Motion being inaugurated in the shafts, the activity of the shafts is enhanced by the action of the internal combustion cylinders Q by the burning of oil fuel in those cylinders. The exhaust gases from the gas cylinders are exhausted through the steam forcing economizers T, and the steam generated in those economizers as well as that of the exhaust from the high pressure cylinders R, is used expansively in the low pressure cylinders S, which actuates the shaft V, the cylinders S being run condensing. The jacket water heat of the oil cylinders could be used to heat the condensed steam for feeding the boilers. This statement as to Fig. 2, sufficiently indicates a use of the inventive idea involved in the present invention when applied in connection with the use of fuel oil used in the internal combustion engine when used in connection with and controlled by steam power. Power plants of this kind when fuel oil is available, are to be desired in certain cases in which the use of a thin fuel gas, like producer gas, is not practically available for internal combustion engines, as for example in war vessels where the great weight of armor and guns precludes the use of the heavy weight installations required in producer gas plants. But with the use of a rich concentrated fuel oil, the requirements of being able to vary the fuel supply to meet wide variations in load to be met makes the use of the internal combustion engine practical when steam would not otherwise be available, while the control of such gas engine plants by a high pressure steam plant makes the availability of large installations possible.

In case I wish to give a high rating to the steam boiler of the plant, and especially if smoke forming fuel is used, I introduce a back pressure valve at the exit of the boiler and introduce air for combustion under pressure both below and above the fuel mass; combustion thus being secured as well as transmission of the heat generated, under controlled mechanically produced pressures higher than usual.

It will be understood, that in large installations of like nature with that herein described, a plurality of gas engines might be used, because of the inherent difficulties in using very large gas engine cylinders. In such cases it would be obvious that one boiler containing and storing super-heated water and one steam engine, will be all that is needed to successively start all of the gas engines; each gas engine being started or controlled by clutch or other connection. In initiating motion in the gas engine, I sometimes use a ratcheted clutch attached to the gas engine shaft, but an electrical motor or other connection can be used. When a number of gas engines are used in generating electric energy each one would drive its own electrical generator, the combined power being unified by synchronous action or through electrical accumulation, from which the unified energy would be transferred to either a single drive shaft, or to the main shaft of a shaft system.

What I claim as new is:—

1. The combination of instrumentalities herein described, which consists of, (1) a high pressure steam generator, (2) an internal combustion engine attached to a motor shaft, (3) a steam engine operated from the high pressure steam generator and attached to said motor shaft, said steam engine controlling the activities of said internal combustion engine and said motor shaft, said steam generator being separate and apart from said internal combustion engine, (4) an economizer for generating steam from the exhaust heat of said internal combustion engine, (5) a low pressure steam engine and an attached motor shaft, and (6) a steam conduit connecting said high pressure steam engine and said economizer with the low pressure engine.

2. The combination of instrumentalities herein described, which consists of, (1) means for generating motive power in a shaft from the expansive burning of a gas, (2) means for controlling by high pressure steam the first named means, and (3) means for developing motive power in another shaft from the heat wastes of the two first named means.

3. The combination of instrumentalities herein described, which consists of, (1) means for generating high pressure steam, (2) means for generating motive power through the explosive burning of fuel, the motive power of the second means being initiated and controlled by motive power generated separate and apart from the second named means, (3) means for generating steam from the heat wastes of the explosive burning, (4) means for generating motive power from high pressure steam reduced in pressure and which has first generated motive power, and (5) means for uniting in work the three generated motive powers.

4. The combination of instrumentalities herein described, in which an internal combustion engine is used, which consists of, (1) means for developing motion in said internal combustion engine and controlling the activities of said internal combustion engine by the expansion of accumulated steam, (2) means for generating steam from the heat wastes of the combination and utilizing the steam thus generated in developing other motion through condensation of the steam, and (4) uniting in work the several motive activities.

JOSEPH MOSES WARD KITCHEN.

Witnesses:
GEO. L. WHEELOCK,
ABRAM BERNSTEIN.

Copies of this patent may be obtained for five cents each, by addressing the "Commissioner of Patents, Washington, D. C."